United States Patent [19]

Wilson et al.

[11] Patent Number: 4,569,309

[45] Date of Patent: Feb. 11, 1986

[54] PORTABLE STOCK HANDLING UNIT

[75] Inventors: James A. Wilson, Bacchus Marsh; James R. Ellis, Melton, both of Australia

[73] Assignee: Holland Hitch Company, Holland, Mich.

[21] Appl. No.: 667,451

[22] Filed: Nov. 1, 1984

Related U.S. Application Data

[62] Division of Ser. No. 627,072, Jul. 2, 1984, abandoned, which is a division of Ser. No. 416,302, Sep. 9, 1982, abandoned.

[51] Int. Cl.⁴ .............................................. A01K 1/06
[52] U.S. Cl. ........................................ 119/99; 119/20
[58] Field of Search ..................... 119/98, 99, 147, 20

[56] References Cited

U.S. PATENT DOCUMENTS

| | | | |
|---|---|---|---|
| 658,128 | 9/1900 | Smith | 119/99 |
| 952,479 | 3/1910 | Sturm. | |
| 1,012,157 | 12/1911 | Reed, Jr. | 119/99 |
| 1,517,573 | 12/1924 | Momyer. | |
| 2,148,551 | 2/1939 | Haigh | 119/98 |
| 2,593,559 | 4/1952 | Heldenbrand | 119/99 |
| 3,018,906 | 1/1962 | Franklin | 214/505 |
| 3,084,669 | 4/1963 | May | 119/98 |
| 3,434,732 | 3/1969 | Heldenbrand | 280/43.17 |
| 3,534,820 | 10/1970 | Groenke | 172/413 |
| 3,788,280 | 1/1974 | Van Gilst | 119/99 |
| 3,796,191 | 3/1974 | McIntire | 119/82 |
| 3,921,585 | 11/1975 | Hall | 119/20 |
| 3,929,104 | 12/1975 | Corbin | 119/82 |
| 3,986,726 | 10/1976 | Vos | 280/423 B |
| 4,201,157 | 5/1980 | Lambert | 119/82 |
| 4,250,836 | 2/1981 | Smith | 119/20 |
| 4,323,033 | 4/1982 | Vosyka et al. | 119/14.04 |
| 4,366,775 | 1/1983 | Tyquin | 119/20 |

FOREIGN PATENT DOCUMENTS

| | | |
|---|---|---|
| 112036 | 11/1940 | Australia. |
| 206509 | 2/1957 | Australia. |
| 270138 | 8/1964 | Australia. |
| 6943 | 6/1966 | Australia. |
| 37037 | 4/1968 | Australia. |
| 292428 | 7/1969 | Australia. |
| 403250 | 5/1970 | Australia. |
| 478051 | 10/1976 | Australia. |
| 1127727 | 4/1958 | Fed. Rep. of Germany ... 280/423 B |

Primary Examiner—Hugh R. Chamblee
Attorney, Agent, or Firm—Price, Heneveld, Huizenga & Cooper

[57] ABSTRACT

The specification discloses a portable stock race and yard including a stock race supported on wheels and a plurality of wings swingably connected to the stock race and arranged to be folded out to form a stockyard. A tongue is pivotally mounted to the race so that the tongue can be moved out of the stock passageway defined by the race. Wing supports are pivotally connected to the sides of the race to support the wings when folded against the race. Further included are shields releasably mountable below the wings, when the wings are folded out to form the stockyard, to prevent small animals within the stockyard from passing under the wings. A wheel support assembly is provided to shift the wheels on either side of the trailer between transportation and retracted positions. A lever assembly is releasably mountable on the wheel support assembly to provide a mechanical advantage in moving that assembly. An improved stock restraint mechanism mounted at one end of the race includes a pair of two-piece bail members movable opposite one another and selectively locked in position securing an animal's head using an improved ratchet mechanism.

5 Claims, 17 Drawing Figures

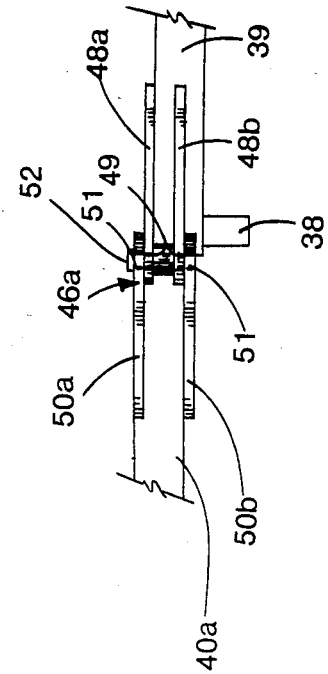
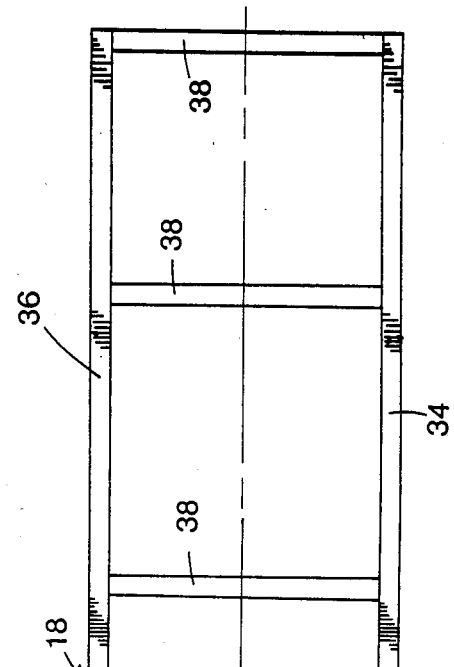
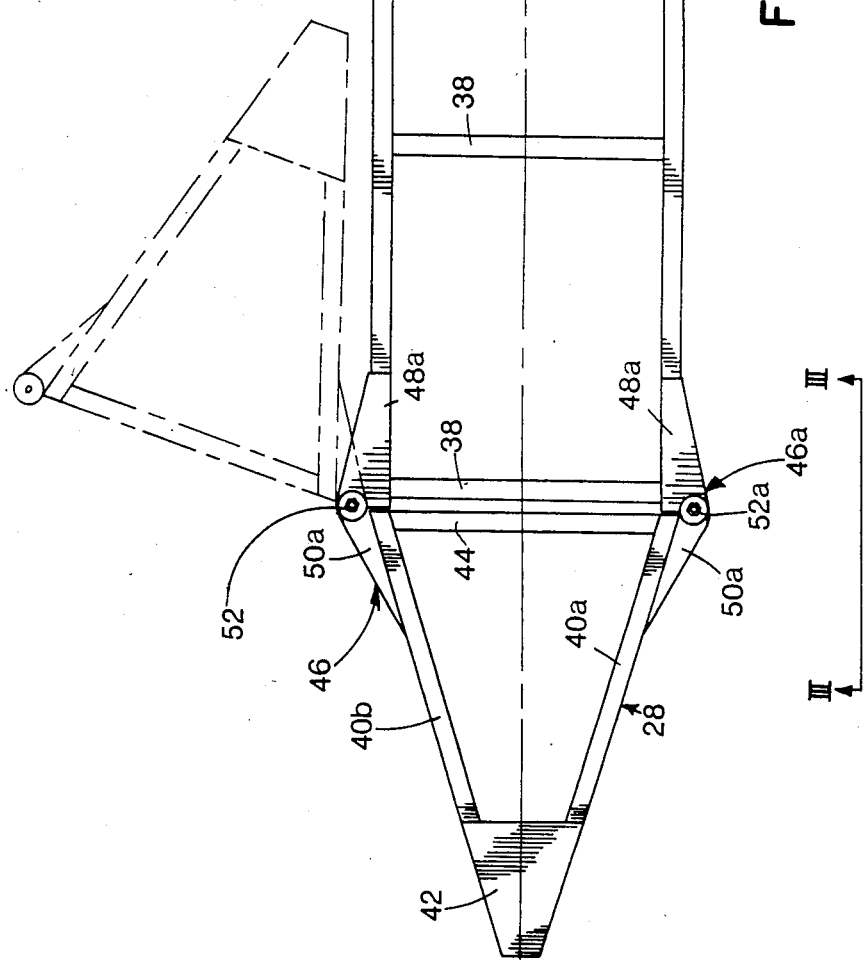
FIG. 3
FIG. 2

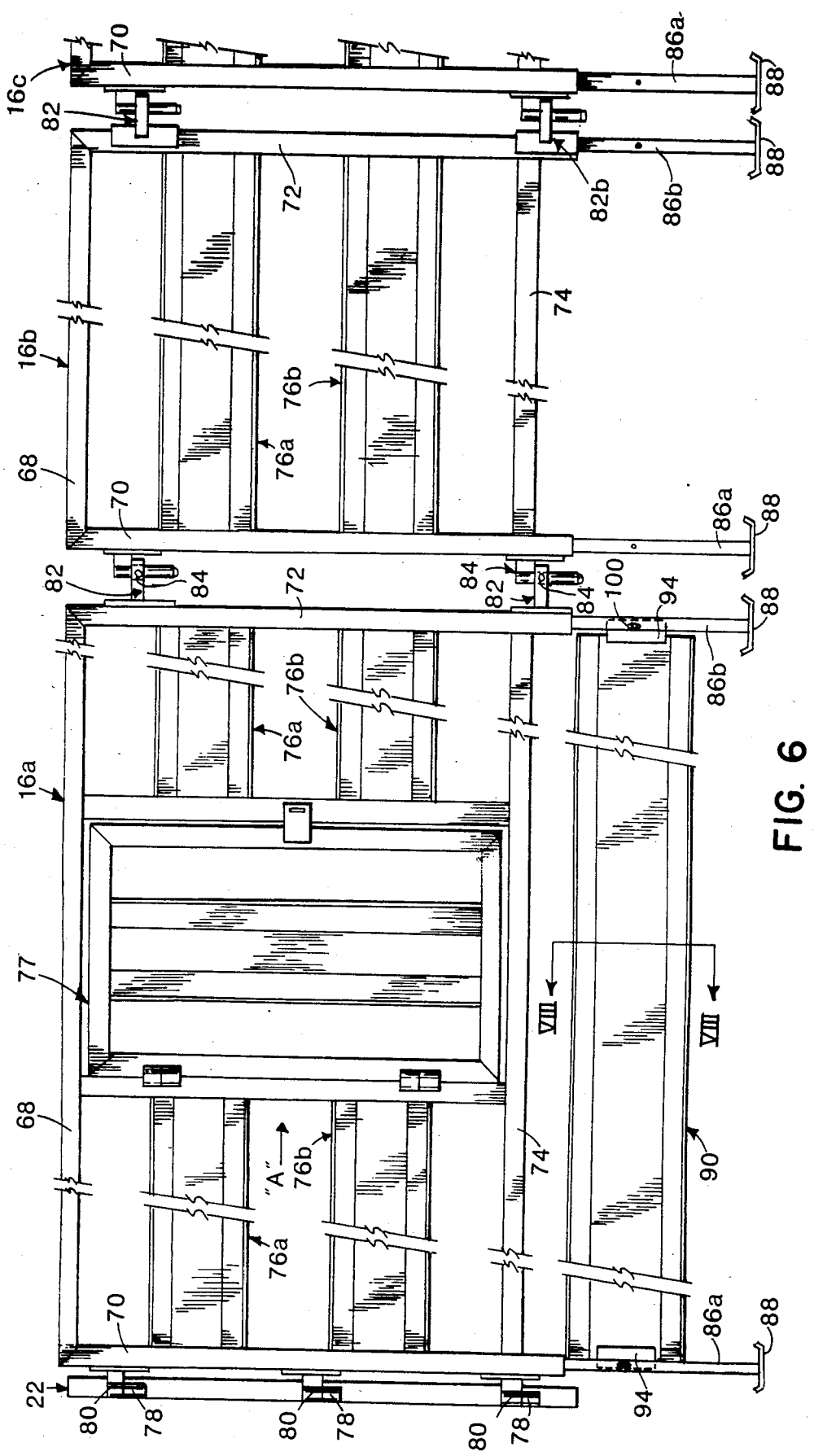

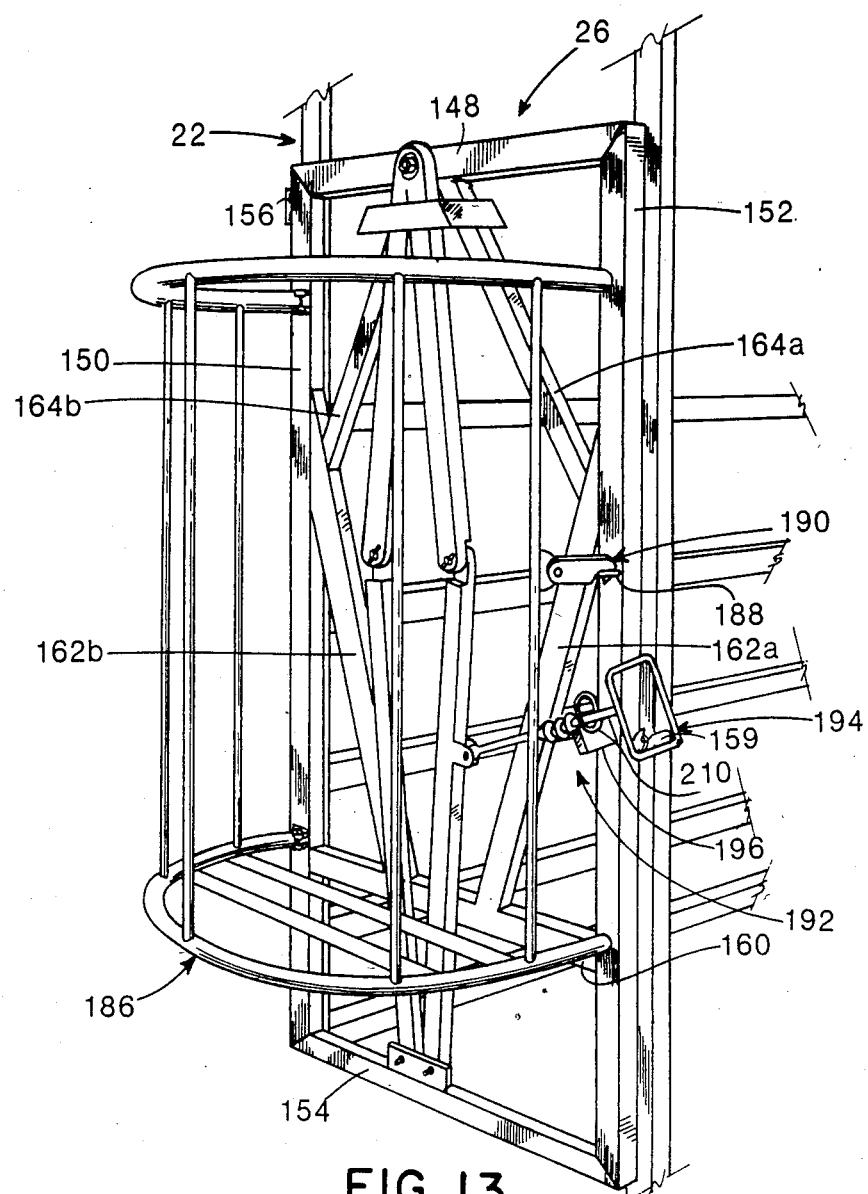
FIG. 13
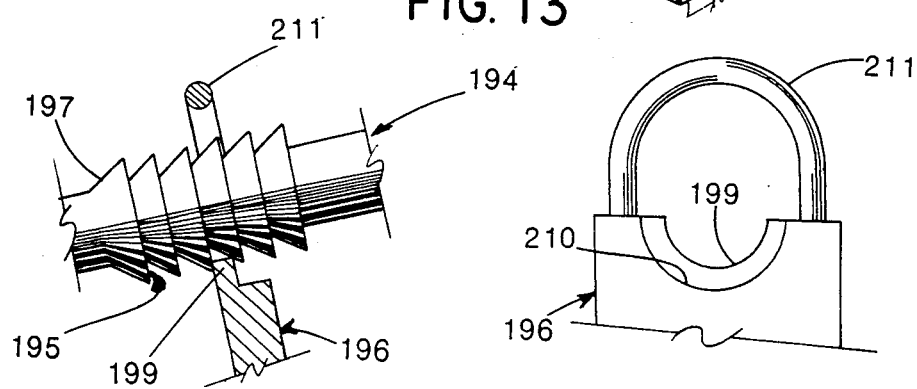
FIG. 16
FIG. 17

PORTABLE STOCK HANDLING UNIT

This is a division of application Ser. No. 627,072, filed July 2, 1984, now abandoned, which is a division of application Ser. No. 416,302, filed Sept. 9, 1982, now abandoned.

BACKGROUND OF THE INVENTION

The present invention relates to portable stock handling units, and more particularly to portable stock handling units including a stock race and a plurality of wings hingedly connected thereto, which may be folded out to form a stockyard.

When stock, such as cattle, are to be treated, the stock is typically herded into a stockyard and then led one at a time through a stock race leading off the yard. While in the race, the animal is treated, (e.g., inoculated or branded). Typically, the race includes a head restraint mechanism so that the animal may be selectively retained within the race during treatment. After treatment, the head restraint mechanism is released and the animal exits the race.

This method of handling stock requires either that the animals be brought to the stockyard and race or that the stock, race, and yard be brought to the animals. When the stock is located in remote areas, it is economically advantageous to select the latter alternative and take the stock handling unit to the stock. In some areas there is no practical alternative. Many such stock handling units are known, with an example being disclosed in copending application Ser. No. 236,150, filed by Tyquin on Feb. 20, 1981, entitled Transportable Stock Unit, that application being a continuation-in-part of application Ser. No. 54,852, filed by Tyquin July 5, 1979, entitled Transportable Stock Unit, now abandoned. The portable units include a stock race mounted on wheels and a plurality of wings hingedly connected to the race and arranged to be folded out to form the periphery of a stockyard.

However, known portable stock handling units are not without their disadvantages. First, the tongue or nose necessary for trailering typically is located forwardly of the race floor and aligned with the race such that animals exiting the race have difficulty traversing the nose. This often results in injury to the stock which trip on, or become otherwise entangled with, the nose. Second, the portable units include supports permanently affixed to the race upon which the wings rest when folded against the trailer. However, these supports which extend outwardly from the trailer even after the wings have been folded out to form the stockyard, interfere with movement about the stock race. Consequently, operators working about the outside of the race are sometimes injured when they inadvertently strike or otherwise engage these dangerously protruding members. Third, because the wings must clear the trailer wheels when folded against the stock race, the wings typically include a lower portion which pivots or slides upwardly along a portion of the wing to an inoperative position, allowing the wing to clear the wheels. However, known constructions permitting the wings to so clear the wheels are relatively complicated and consequently expensive and prone to failure. Also, the necessity for additional structure increases the vehicle's weight. Fourth, the race wheels are typically mounted on wheel assemblies which may be shifted between a transportation position wherein the wheels engage the ground and an inoperative, retracted position wherein the race is allowed to rest directly on the ground. The winch-actuated lever mechanisms required to actuate these shiftable wheel assemblies are permanently mounted to the assemblies and extend above the wheels such that the lever mechanisms interfere with the wings when the wings are to be folded against the stock race and also interfere with the operators working about the race when stock is conducted therethrough. Fifth, the animal head restraint mechanism often includes a pair of one-piece bail members, at least one of which is movable with respect to the other to selectively engage an animal's head therebetween to selectively secure the animal within the race. However, such one-piece bails do not readily adapt to different stock of height and size requiring the bail members to be adaptable to different size animals passing therethrough.

Another important factor is the necessity of avoiding excessive weight both because of the power needed to move the trailer and the fact that the equipment of necessity is often transported over trails or open and rough terrain without benefit of roads. Restricting weight is also important to permit the equipment to be erected and disassembled or packed for transport by a minimum number of personnel without the use of power assistance.

SUMMARY OF THE INVENTION

The aforementioned problems are solved by the present invention. Essentially, a portable stock handling unit is provided of the general type including a transportable stock race and a plurality of wings hingedly connected to the race and arranged to be folded out to form at least a portion of the periphery of a stockyard. The portable race includes a race floor and a trailer tongue movable between a towing position immediately forward of, and aligned with, the race floor and an inoperative position wherein the tongue is absent from the area immediately forward of the race floor. Consequently, before stock is conducted through the race, the tongue may be moved to its inoperative position so that animals passing through the race do not trip, or become otherwise entangled with, the tongue. This also permits the unit to be up to the side of a truck, freight car or similar vehicle for loading cattle without the tongue forming an obstruction.

In a second aspect of the invention, a wing support is pivotally mounted on the side of the stock race and movable between a supporting position, wherein the support extends outwardly from the side to support the wings when folded against the race, and an inoperative position, wherein the support lies substantially against the race and does not interfere with operator movement about the race. Accordingly, the wings are properly supported on the wing supports when the wings are folded against the race, and yet the supports may be folded to a safe storage position against the race when the wings have been removed therefrom to form the stockyard.

In a third aspect of the invention, the wings are supported on the stock race at a height sufficiently high to permit the wings to clear the wheels when folded against the race. The wings additionally include legs to support the wings on the ground when folded out to form the stockyard. A plurality of panel sections is provided, one of each being releasably mountable on the legs and below each of the wings to prevent stock from passing out of the stockyard under the wings.

Consequently, the wings are readily moved to their transportation position against the stock race by removing the panel sections from the wing legs and folding the wings above the wheels. However, when the wings are folded out to form the stockyard, the panel sections are secured below the wings to insure against escape of stock from the yard.

In a fourth aspect of the invention, the stock unit includes first and second wheels and a wheel assembly mounted on the race and operatively supporting the wheels. The wheel assembly is shiftable between a transportation position, wherein the wheels support the unit on the ground, and a retracted position, wherein the race rests directly on the ground. Further included is a lever mechanism releasably mountable on the wheels assembly, for providing a mechanical advantage in moving the wheel assembly, and a winch means releasably connectable to the lever mechanism, for providing a mechanical advantage in moving the lever mechanism. When the wheel assembly is to be operated, the lever mechanism is mounted on the wheel assembly and the winch means is connected to the lever mechanism to provide the necessary mechanical advantage to move the wheels. When wheel assembly movement is complete, the lever mechanism may be removed from the wheel assemblies and stored on the vehicle so that the mechanism does not interfere with the folding of the wings against the stock race or with operators working about the race.

In a fifth aspect of the invention, the stock race includes a stock holding means, or bail, including first and second bail members operatively supported by the frame for movement opposite one another. Each of the bail members has a two-piece construction including an upper member pivotally connected to a lower member. Additionally, both upper members and lower members are mounted for pivotal movement with respect to the frame to define a generally diamond-shaped opening through which an animal's head may pass. This bail, when closed, secures a wide variety of head sizes and heights. Therefore, the bail need not be adjusted for different size and height stock.

In a sixth aspect of the invention, an improved ratchet mechanism is provided to operate the bail. The ratchet member includes a catch operatively secured to the frame and an actuating arm having a first end pivotally connected to at least one of the bail members so that the arm pivots by gravity in a substantially vertical plane onto the catch. The arm further includes ratchet means on its undersurface so that the actuating arm may, if necessary, be used to force the bail closed and then rested on the catch to hold the arm and bail arm in position. The design of the bail is such that upon release of the arm, the bail is gravity biased to be self-closing. When the animal is to be released, the actuating arm is lifted and pulled outwardly thereby opening the bail.

These and other objects, advantages, and features of the invention will be more fully understood and appreciated by reference to the written specification and appended drawings.

BRIEF DESCRIPTION OF THE DRAWINGS

FIG. 2 is a top plan view of the base frame of the unit showing the inoperative or retracted position of the tongue in phantom;

FIG. 3 is a fragmentary, elevational view taken along plane III—III in FIG. 2;

FIG. 6 is a fragmentary, elevational view of several wings unfolded to form the periphery of the stockyard;

FIG. 13 is a fragmentary perspective view of the bail door in its closed position;

FIG. 16 is a fragmentary, enlarged sectional view of the bail door latch and catch; and FIG. 17 is a fragmentary, enlarged view of the catch for the bail door latch.

DESCRIPTION OF THE PREFERRED EMBODIMENT

Figure 1:
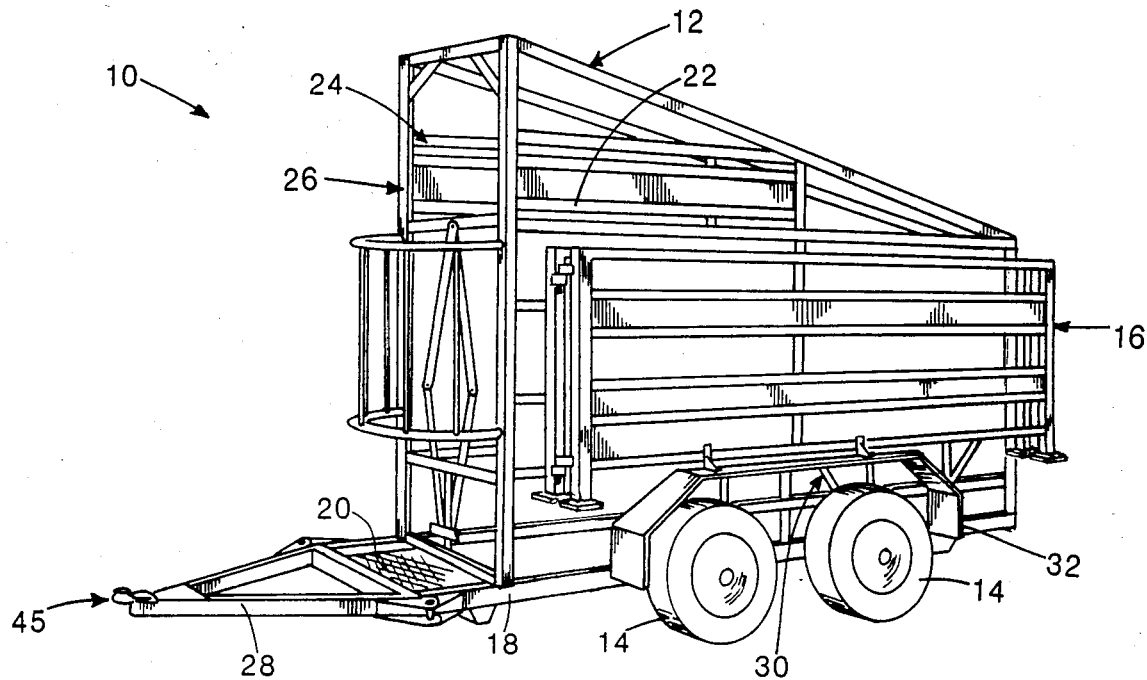
FIG. 1 is a perspective view of the portable stock handling unit of the present invention ready for transportation.

A portable stock handling unit constructed in accordance with a preferred embodiment of the invention is illustrated in the drawings and generally designated 10. As seen in FIG. 1 (the transportation configuration), unit 10 includes stock race 12, supported on wheels 14, and a plurality of wings 16 hingedly connected to the stock race and arranged to fold out to form at least the periphery of a stockyard. Stock race 12 includes base frame, or chassis, 18, stock supporting floor 20 supported on the base frame, and a pair of spaced side walls 22 and 24 extending upwardly from the base frame and defining a stock raceway. Bail gate 26 is located at the forward end of stock race 12 and includes a bail mechanism (see FIG. 14) for selectively securing an animal within the race. A rear gate (see FIG. 9) is hingedly mounted to the rearward end of race 12 leading to the stockyard. Nose, or tongue, 28 is pivotally connected to the forward portion of base frame 18 and may be secured in the towing position shown in FIG. 1 or moved to an inoperative position (see FIG. 2) wherein the tongue will not interfere with animals exiting race 12 through bail door 26. Fenders 32 are releasably mounted on wings 16 over wheels 14. Wheels 14 are supported on wheel support assemblies 30 which are, in turn, connected to base frame 12. Assemblies 30 may be shifted between a transportation position shown in FIG. 1, wherein unit 10 is supported on wheels 14, and a retracted position (see FIG. 4) wherein the wheels are pivoted upwardly allowing stock race 12 to rest on the ground.

Stock unit 10 may be used to treat stock by towing the unit to the area at which the animals are located.

Fenders 32 are removed from wings 16 and tongue 28 is pivoted to its inoperative position shown in phantom in FIG. 2. Wings 16 are folded outwardly so that access may be had to wheel support assemblies 30 to pivot wheels 14 to their retracted position, permitting race 12 to be lowered to the ground. Wings 16 are folded out to form the periphery of a stockyard. Stock is herded into the stockyard and individually conducted through race 12 for treatment, such as inoculation or branding. As each animal is conducted through race 12, its head is secured within bail gate 26 to retain the animal within the race during treatment. After treatment is complete, the animal's head is released from bail gate 26, and the gate is opened (see FIG. 12) so that the animal may exit the race. When all of the stock have been treated, unit 10 is readied for transportation by folding wings 16 against one another and lifting the race 12 about the wheels 14 so that they alone are in ground contact and again support unit 10. Wings 16 are secured against sides of stock race 12; fenders 32 are mounted on wings 16 above wheels 14; and tongue 28 is resecured in its towing position. Unit 10 is then hitched to a towing vehicle and towed to the next location.

Draw Bar

The construction of base frame 18 and folding tongue, or draw bar, 28 is shown in greater detail in FIGS. 2 and 3. Base frame 18 (FIG. 2) comprises a pair of spaced longitudinal members 34 and 36 interconnected by five cross members 38. Tongue 28 includes a pair of diagonal members 40a and 40b fastened at their forward ends to each other and to plate 42 and interconnected at their rearward ends by brace member 44. Conventional hitch 45 (see FIG. 1) is mounted on plate 42.

Both of hinges 46 and 46a are generally identical to one another with one being the mirror image of the other. Accordingly, only hinge 46 (FIGS. 2 and 3) will be described in detail. A pair of hinge flanges are mounted on longitudinal member 34 to extend outwardly therefrom. Both of hinge flanges 48 define pin-receiving apertures 49 which are generally aligned with one another. Similarly, flanges 50 are mounted to, and extend outwardly from, diagonal member 40a and define a pair of pin-receiving apertures 51. All of apertures 49 and 51 are generally coaxially aligned when tongue 28 is in its transportation position as shown in FIG. 2. Pins 52 and 52a are positioned within apertures 49 and 51 to releasably secure flanges 50 to flanges 48, and consequently tongue 28 to base frame 18.

Tongue 28 may be pivoted to an inoperative position as shown in phantom in FIG. 2 by removing pin 52 from hinge 46a and pivoting tongue 28 with respect to base frame 18 about hinge 46a. Consequently, tongue 28 is movable between a transportation position, wherein the tongue is located immediately forwardly of base frame 18 aligned with race 12, and an inoperative, or retracted, position, wherein the tongue is absent from the area immediately forward of the race. Tongue 28 can also be pivoted in the opposite direction by removing pin 52a and pivoting the tongue about hinge 46. Further, both pins 52 and 52a may be removed from hinges 46 and 46a and tongue 28 removed from base frame 18 altogether. Because tongue 28 can be moved away from the area forward of, and aligned with, race 12, stock passing through the race do not trip on, or become otherwise entangled with, the tongue. This greatly reduces the chance of injury to stock passing through race 12.

Wing Supports

Figure 4:
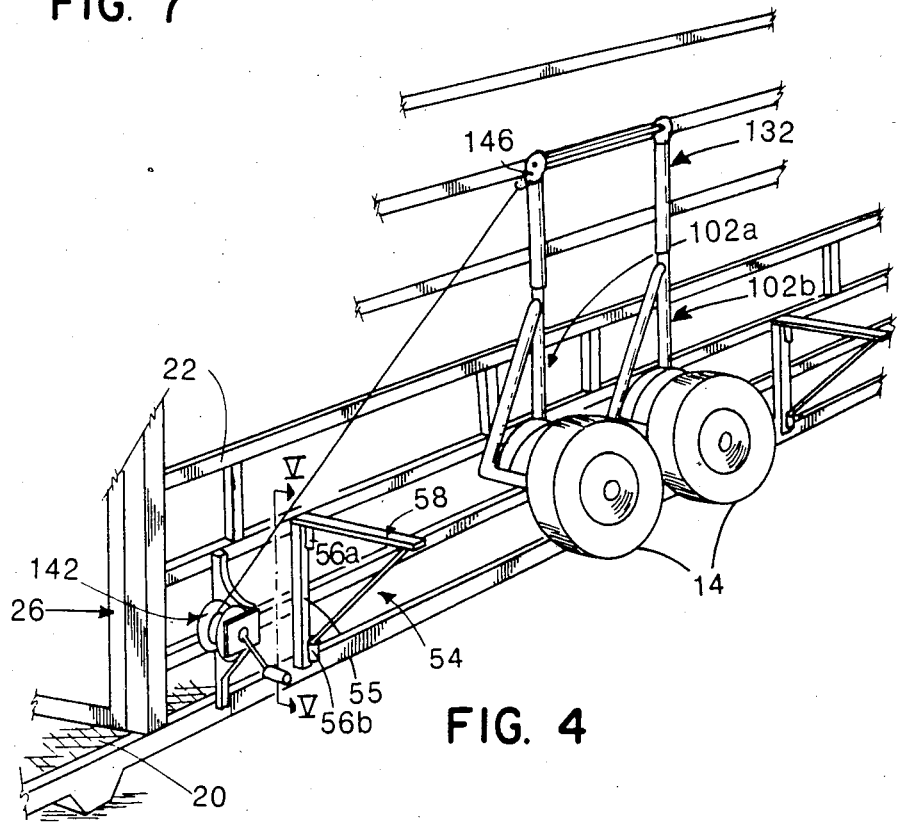
FIG. 4 is a fragmentary, perspective view of the pivotal wing support and the wheel raising and lowering mechanism.
Figure 5:
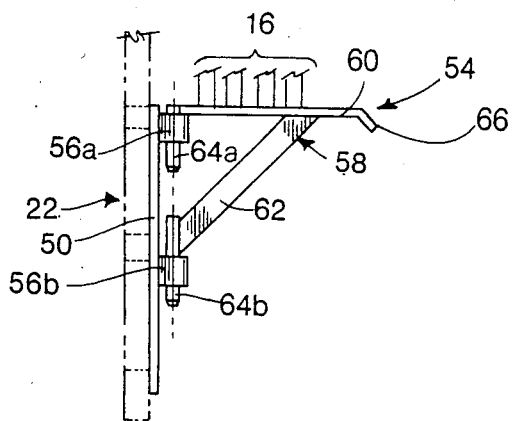
FIG. 5 is a side elevational view of the pivotal wing support taken along plane V—V in FIG. 4.
Figure 9:
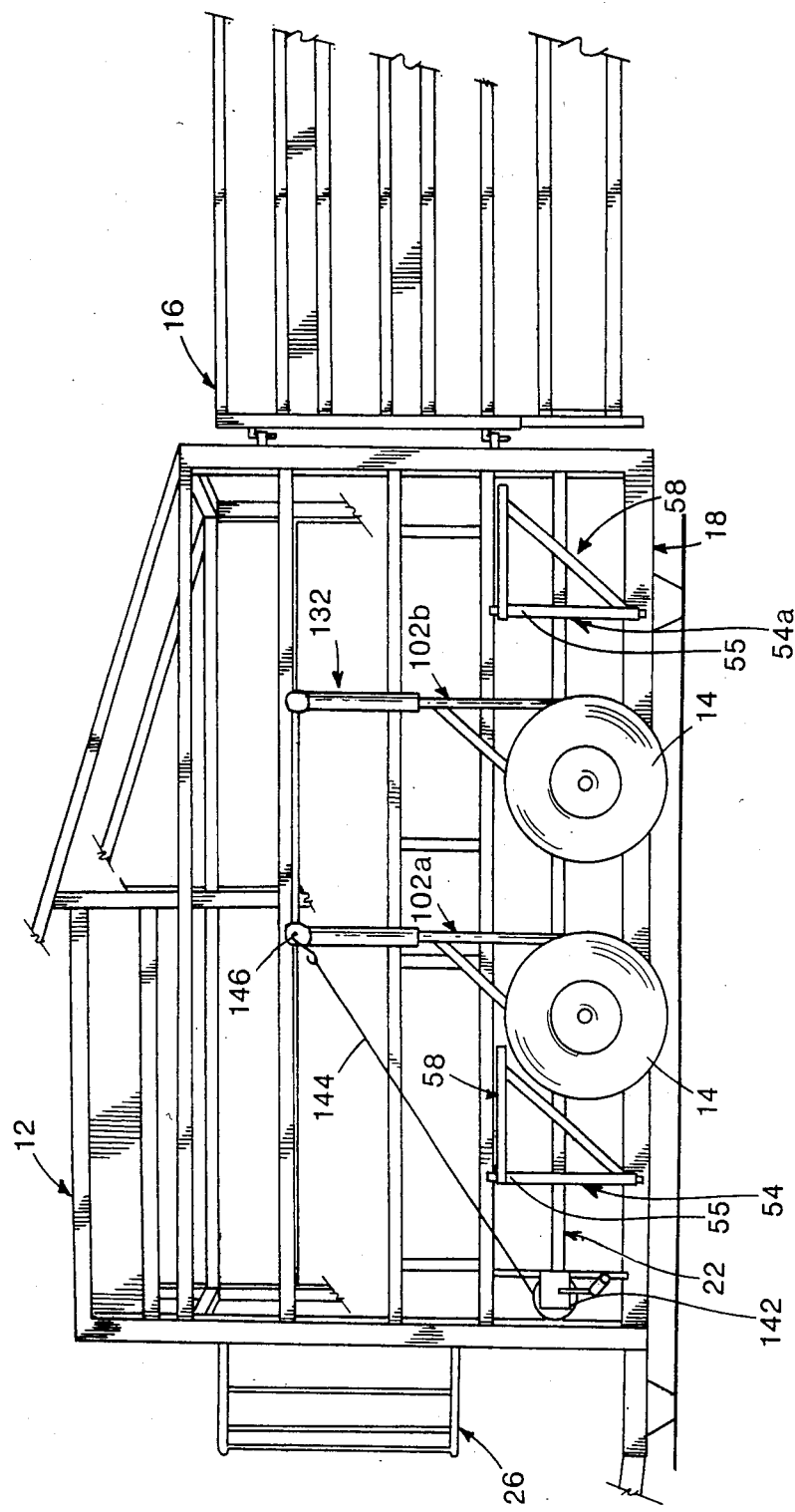
FIG. 9 is a side elevational view of the stock race with the wheels in their retracted position.

FIGS. 4, 5, and 9 show wing supports 54 mounted on side 22. Identical supports (not shown) are also mounted on opposite side 24. Two supports 54 and 54a (FIG. 9) are located one forwardly and one rearwardly, respectively, of wheels 14. Supports 54 and 54a are pivotally connected to side 22 of race 12 to be movable between a wing-supporting position extending from side 22 (FIGS. 4 and 5) and a retracted position folded substantially against the side (FIG. 9). As most clearly seen in FIG. 5, each of supports 54 and 54a includes a pair of tubes, or rings, 56 secured to mounting brace 55, which is in turn secured to side 22. Bracket 58 includes horizontal support member 60 and brace 62 extending downwardly from brace 60 toward side 22. Pins 64a and 64b are secured to extend downwardly from support member 60 and brace 62, respectively, through tubes 56a and 56b, respectively. Consequently, bracket 58 is free to pivot with respect to side 22 about pins 64 within tubes 56. Leading edge 66 of horizontal member 60 is beveled downwardly to accommodate the reception of wings 16 as the wings are folded against side 22.

When wings 16 are folded out from side 22 to form the stockyard, the wings slide off of bracket 58 and more particularly support member 60. Brackets 58 are then pivoted substantially against side 22 (FIG. 9) so that operators moving about the trailer will not strike or otherwise engage the brackets, potentially injuring themselves. When wings 16 are to be folded against side 22, brackets 58 are first pivoted to their operative positions (FIGS. 4 and 5) wherein the brackets extend outwardly from the side. Wings 16 are then folded against side 22 and slid onto bracket 58 and more particularly support member 60. Leading edge 66 of the support member facilitates the proper alignment of wings 16 with the support members. Consequently, pivotal wing supports 54 and 54a provide the necessary support for the wings when unit 10 is configured in its transportation configuration. However, wing supports 54 and 54a can be pivoted to a safe, unobtruding position during treatment of the stock to reduce the potential of injury to workers.

Wings

Figure 7:
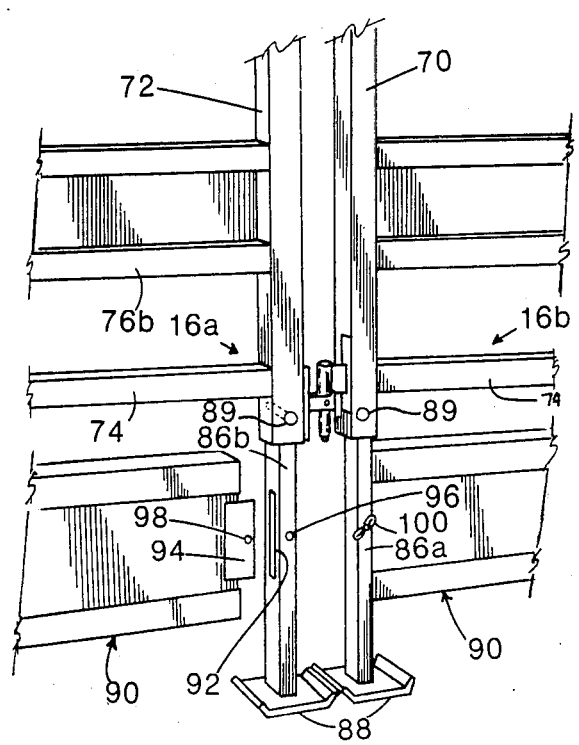
FIG. 7 is a fragmentary, perspective view of a panel section about to be secured within a wing leg.

The construction of wings 16 is illustrated in FIGS. 6 and 7. Wings 16 are pivotally connected sequentially to one another. Additionally, wing 16a is hingedly connected to side 22. Each of wings 16 includes an upper member 68, a left side member 70, a right side member 72, and a bottom member 74 interconnected to define a generally rectangular frame. Additionally, a pair of panels 76a and 76b extend generally horizontally between side members 70 and 72.

Additionally in wing 16a, door 77 is mounted between a pair of braces 79 which in turn are mounted between top member 68 and bottom member 74. Three tubes, or rings, 78 are mounted one above the other on side 22 and define apertures opening generally upwardly. Additionally, three L-shaped pin members 80 extend from left side member 70 of wing 16a into tubes 78. Wing 16a is mounted to side 22 at a height sufficient for bottom member 74 to clear wheels 14, whether the wheels are in their lowered or retracted position, when the wings are folded against the trailer (see FIG. 1). A pair of brackets 82 extends laterally from right side member 72 of wing 16a and define upwardly opening apertures 84.

The remainder of wings 16 (i.e., 16b, 16c, etc.) are generally identical to wing 16b. Wing 16b includes members 68, 70, 72, 74, and 76 as described above. Pins 84 extend laterally from left member 70 of wing 16b and into apertures 84 of brackets 82 on wing 16a. Brackets 82 extend laterally from right side member 72 of wing 16b. Consequently, as many wings 16 may be interconnected as desired to provide a stockyard having virtually any shape and size; however, limitations on the desired width of unit 10 practically limit the number of wings which can be included.

Each of wings 16 includes a pair of legs 86a and 86b (FIGS. 6 and 7) telescopically received within side members 70 and 72, respectively, so as to be vertically shiftable. Podded feet 88 are connected to the lower end of each leg 86 to prevent the leg from pushing into the ground under the weight of wings 16. Legs 86a and 86b are telescopically retracted into members 70 and 72 when wings 16 are to be folded against stock race 12 and are telescopically extended when the wings are to be supported on the ground forming a stockyard. Any suitable commercially available locking device, for example pin 89 (see FIG. 7), may be used to selectively lock legs 86 within members 70 and 72.

Figure 8:
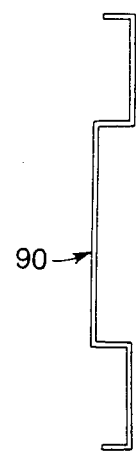
FIG. 8 is a sectional view taken along plane VIII—VIII in FIG. 6.

Panel, or shield, 90 (FIGS. 6 and 7) is releasably secured below each wing 16 between legs 86a and 86b. Each leg 86 defines a slot 92 (see FIG. 7) extending transversely therethrough into which a flange 94 from shield 90 may be inserted. Both leg 92 and flange 94 define apertures 96 and 98, respectively, which are coaxially aligned when flange 94 is properly inserted within slot 92. A wing nut 100 is then inserted through, and secured in, apertures 96 and 98 to retain panel 90 in position. With the exception of flanges 94, panels 90 are generally identical to panels 76 of wing sections 16 and have a cross section as illustrated in FIG. 8 for strength. When wings 16 are folded out to form the stockyard, legs 86 are extended from wings 16 and panels 90 secured therebetween to prevent small stock from passing under the wings. When wings 16 are to be folded against side 22 of stock race 12, shields 90 are removed from legs 86 and stored for transportation, for example, on floor 20 of race 12. Legs 86 are then telescoped into wings 16, which are then folded against side 22, clearing wheels 14.

Wheel Mechanism

Figure 11:
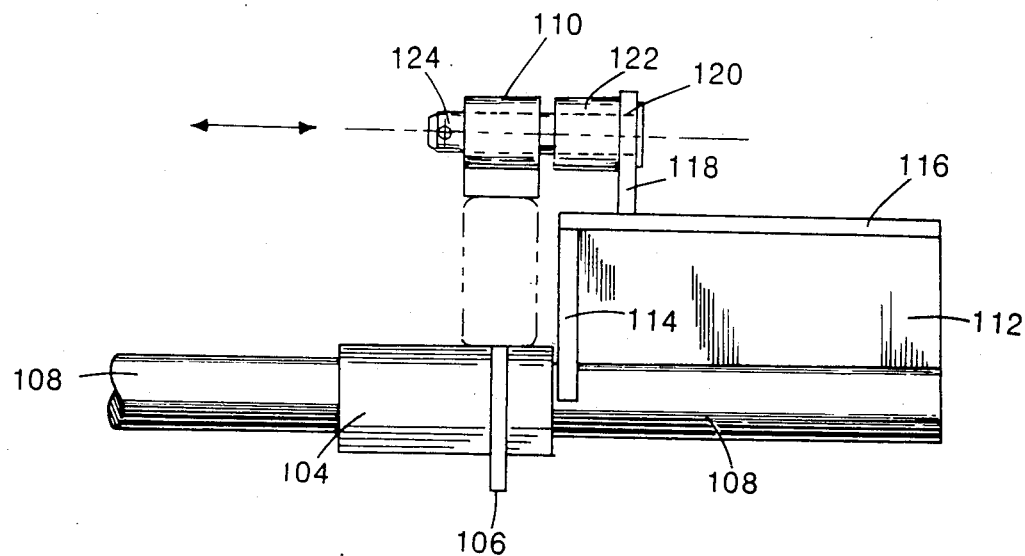
FIG. 11 is a front elevational view with the lever-receiving structure removed taken along plane XI—XI in FIG. 10.
Figure 10:
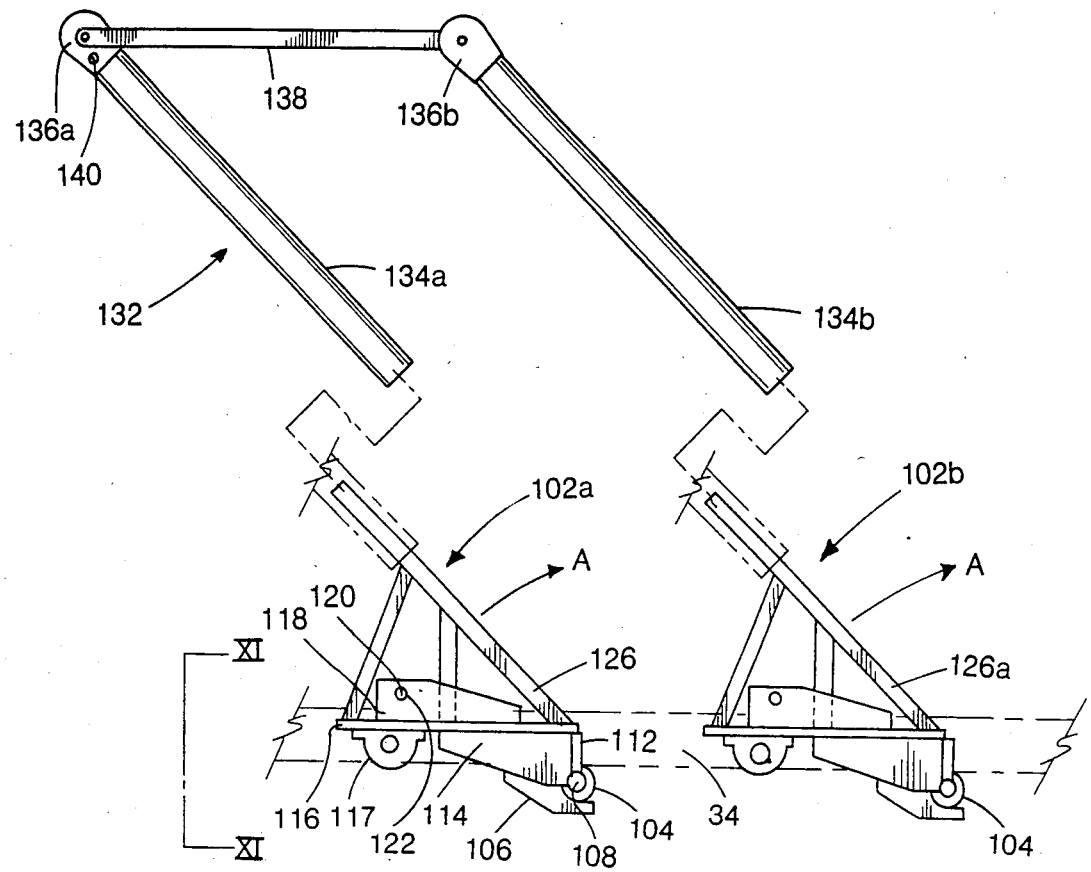
FIG. 10 is an exploded side elevational view of the wheel raising and lowering mechanism with the wheels removed.

The structure affecting the raising and lowering of wheels 14 relative to the body of the race is illustrated in FIGS. 4, 9, 10, and 11. A pair of wheel supporting assemblies 102a and 102b (FIG. 10) are secured to longitudinal member 34 of base frame 18. A pair of wheel assemblies (not shown) mirror-imaging assemblies 102 is mounted on the opposite side of base frame 18. Assemblies 102a and 102b are generally identical to one another; consequently, only assembly 102a (FIGS. 10 and 11) will be described in detail. Tube 104 is secured to the underside of member 34 of base frame 18. Support 106 is secured between frame member 34 and tube 104 to further support the tube on base frame 18. Axle 108 is rotatably mounted within tube 104 such that axle 108 interconnects wheel assemblies 102 on opposite sides of stock race 12. Tubular socket 110 is mounted on the upper surface of member 34 to open laterally. Supports 112 and 114 are both generally planar and rigidly secured together at generally a right angle and both extend radially from and are rigidly secured to axle 108 as by welding. Wheel support plate 116 is also generally planar and secured as by welding to both of supports 112 and 114. Secured to the underside of wheel support plate 116 are axle supports 117 (see FIG. 10), which mount the axles (not shown) of wheels 14. Pin bracket 118 extends generally perpendicularly upwardly from wheel support plate 116 and defines pin aperture 120. Tube 122 is mounted on bracket 118 coaxially with aperture 120 to provide additional bearing support. Pin 124 is insertable through bracket 118, tube 122, and socket 110 when wheel assembly 102 is in its operative, transport position as shown in FIGS. 10 and 11. Lever receiving member 126 extends upwardly and forwardly from the rear end of plate 116 at approximately a 40° angle from the plate. Braces 128 and 130 interconnect and are rigidly secured to the front end of plate 116 to support member 126 thereabove. The rearward support assembly is an identical construction and includes a support member 126a.

Lever mechanism, or linkage, 132 (FIG. 10) includes a pair of tubular members 134 and 134a dimensioned to telescopically fit onto receiving members 126 and 126a, respectively, as shown in phantom. Both of members 134 and 134a terminate at their upper ends in a flattened portion 136, with spacing bar 138 pivotally connected between portions 136. Additionally, flattened portion 136a defines cable-receiving aperture 140. The lever mechanism, when secured to the support assemblies constitutes a parallelogram.

Winch 142 (FIGS. 4 and 5) is secured to side 22 of stock race 12 in any conventional manner. Cable 144 extends from winch 142 and includes hook 146 at its free end. Hook 146 is selectively engagable with aperture 140 in lever mechanism 132.

Wheel assemblies 102 are shown locked in their transportation position in FIGS. 10 and 11 wherein pin 124 extends through both bracket 118 and socket 110. When unit 10 is to be set up for treatment of stock, the stock race must be lowered between wheels 14 so it can rest on the ground. to do so, wings 16 are pivoted a short distance out from stock race 12 to provide access to wheel assemblies 102 located therebehind; and lever mechanism 132 is installed on the assemblies 102, by telescoping members 134 and 134a onto receiving members 126 and 126a. Sufficient cable 144 is then played from winch 142 so that hook 146 may be secured within aperture 140. Winch 142 is then operated to pull mechanism 132 forwardly a short distance to free pins 124 so they may be removed. Winch 142 is then operated to play cable 144 from the winch, allowing lever mechanism 132 to shift rearwardly, lowering race 12 about the wheels. Ultimately wheels 14 assume the position shown in FIGS. 4 and 9 wherein assemblies 102 are pivoted in the direction indicated by arrows A (FIG. 10) to their retracted position and wherein wheels 14 no longer support the race. After race 12 has been so lowered, lever mechanism 132 is removed from assemblies 102 and stored in a convenient location so as not to interfere with the operation of the race.

When unit 10 is again to be readied for transportation, mechanism 132 is reinstalled on assemblies 102 and winch 142 is operated to draw lever mechanism 132 forwardly until apertures 120 in brackets 118 are aligned with sockets 110. Pins 124 are then reinserted through brackets 118 and tubes 110 to support assemblies 102 in the transportation position. Hook 146 is removed from aperture 140, and cable 144 is spooled onto winch 142. Lever mechanism 132 is then removed from assemblies 102 and stored within the stock race 12 during transportation so that the mechanism does not interfere with the storage of wings 16 against race 12.

Bail

Figure 14:
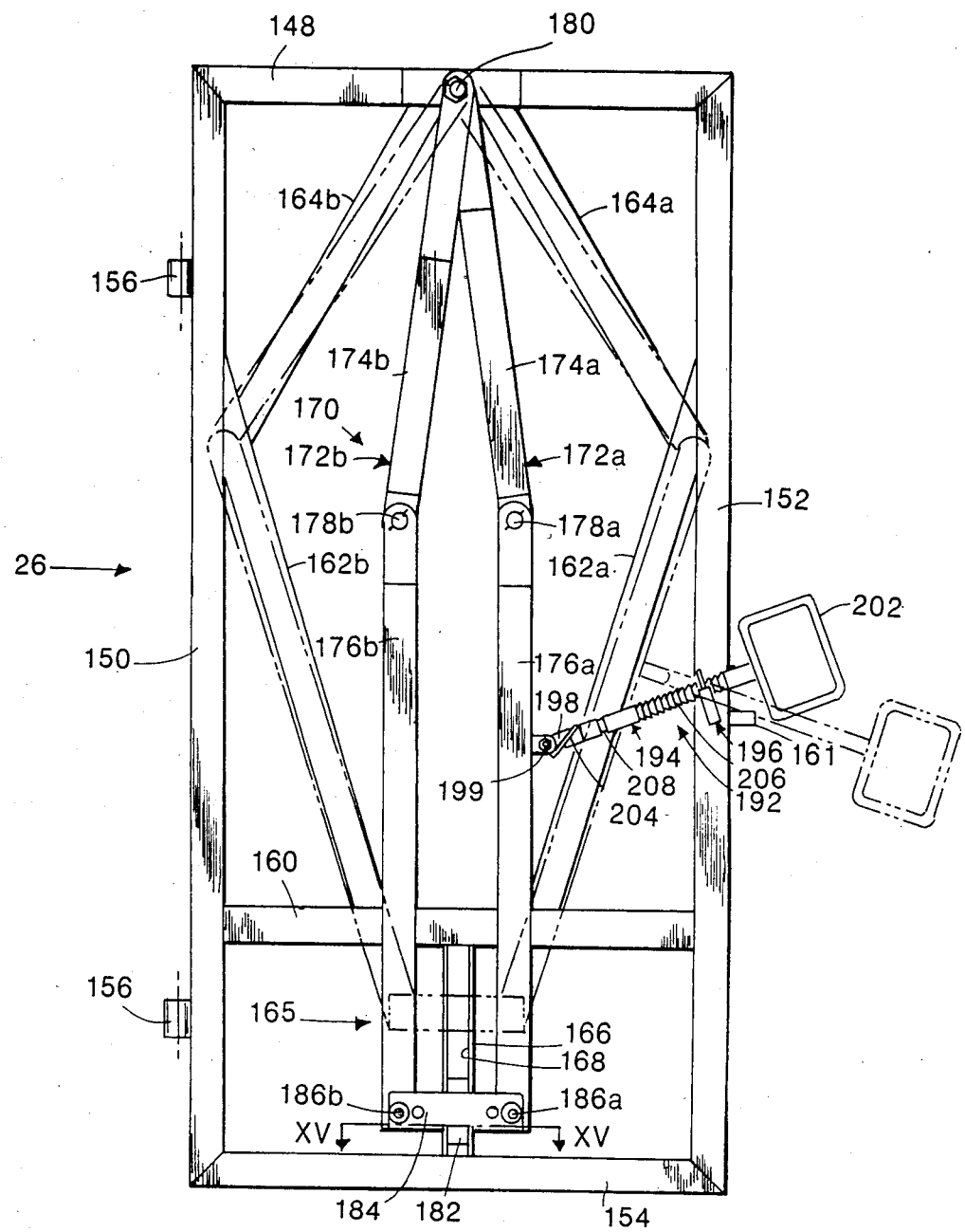
FIG. 14 is a front elevational view of the bail door.
Figure 15:
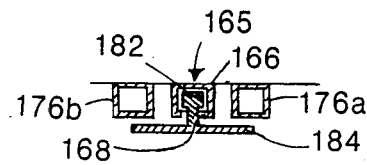
FIG. 15 is a sectional view taken along plane XV—XV in FIG. 14.

Bail gate 26 is illustrated in FIGS. 12, 13, 14, and 15. Turning initially to FIG. 14, bail gate 26 includes a generally rectangular frame comprised of top member 148, left side member 150, right side member 152, and bottom member 154. A pair of tubes 156 extend from side wall 22 and are pivotally received on pins 158 (see FIG. 13) to hingedly mount door 26 on race 12. Consequently, gate 26 can pivot between an open position (see FIG. 12) wherein stock is free to pass through race 12 and a closed position (see FIG. 13) wherein an animal may be selectively retained in the race. Latch 159 (FIG. 12) releasably secures pin 161 (FIG. 12) extending from door side member 152 to secure door 26 in the closed position.

Returning to FIG. 14, cross bar 160 extends between side members 150 and 152 at a position above bottom member 154. Lower-diagonal braces 162a and 162b extend between cross bar 160 and side members 152 and 150, respectively. Additionally, upper-diagonal braces 164a and 164b extend between braces 162a and 162b, respectively, and top member 148. Sliding mechanism 165 includes track 166, slide 168, and end plate 184. Tubular track 166 (FIGS. 14 and 15) is secured to and extends between cross bar 160 and bottom member 154 and includes an open side 168 along its entire height.

Bail assembly 170 (FIG. 14) includes first and second bail members mounted for movement opposite one another. Each of bail members 172 includes upper members 174 and 174a and lower members 176 and 176b pivotally interconnected by pin 178. Additionally, both of upper members 174 are pivotally connected to upper frame member 148 of bail door 26 by common pin 180. Slide member 182, (FIGS. 14 and 15) generally T-shaped in horizontal cross section, is slidingly received within track member 166 and extends outwardly through open side 168. End plate 184 is permanently affixed to slide 182 to reciprocate along track member 166 with the slide. Lower members 176a and 176b are pivotally connected to end plate 184 by pins 186. Consequently, lower members 176 are free to pivot with respect to bail door 26, and sliding mechanism 165 permits the lower end of the bail to shift vertically in the plane of the bail door 26.

As seen in FIG. 13, bail cage 186 is pivotally connected to side member 150 and releasably secured in a closed position by latch 190 extending from the bail cage to engage catch 188 mounted on door side member 152.

Ratchet mechanism 192 (FIGS. 13 and 14) serves as a catch mechanism for the bail and includes latch 194 and catch 196. The inner end of the latch is pivotally connected to lower bail member 176a by pin 199. A handle 202 is provided on its opposite end. Latch 194 is inclined upwardly and outwardly at a minor angle and is supported on catch 196. Handle 202 is relatively large to facilitate ease of grasping. Spring 204 is incorporated into pivot 199 and urges latch 194 into engagement with the catch. Intermediate end 198 and handle 202, the latch includes a ratcheting surface 206 consisting of a plurality of axially spaced grooves. The grooves are shaped to provide a radially extending shoulder 195 at the inner end of each groove and a radially outwardly tapered wall 197 forming a camming surface extending to the top of the shoulder of the next axially outward groove (FIG. 16). The shoulders 195 engage the stop lip 199 of the catch 196 providing a positive lock against outward movement of the latch unless it is forcibly lifted clear of the top lip 199. Thus, an animal cannot force the bail to open by pushing against the sides of the bail. The catch to provide a positive seat for the latch and to assure adequate bearing against the thrust of a disturbed animal is provided with a semicircular latch seat 210 (FIG. 17). Excessive upward pivoting of the latch is prevented by semicircular retaining bar 211.

A hold 208 is formed in latch 194 adjacent end 198 to temporarily hold the bail open to receive a new animal. It is formed by a single groove with the shoulder forming wall at its outer side to seat against the opposite face of the stop lip 199 (FIGS. 13 and 17).

Bail assembly 170 may be opened or closed by the latch 194. Prior to the entry of an animal within stock race 12, bail door 26 is closed as shown in FIG. 13. The bail members 172 are separated by pulling the latch 194 outwardly by means of the handle 202. As member 172a is pulled sideways, slide 182 and securing plate 184 secured thereto are shifted upwardly forcing bail members 172 apart. The latch is secured in bail-open position by engaging hold 208 on the catch. The animal is then permitted to enter race 12. When the animal's head has passed through the bail members 172, the latch 194 is lifted to disengage the catch 196 and pushed inwardly to force bail members 172 together entrapping the animal's neck therebetween. Ratchet surface 206 rides on catch 196 as the latch 194 moves inwardly and then catches to maintain bail members 172 in engagement with the animal's neck. Due to the fact that bail members 172 define a generally diamond-shaped opening (as most clearly seen in phantom in FIG. 14), the bail members securely engage the animal's neck regardless of the height or size of the animal. The shape of the bail members and the fact that their lower ends are free to move vertically biases the bail to close automatically and the latch is released.

Figure 12:
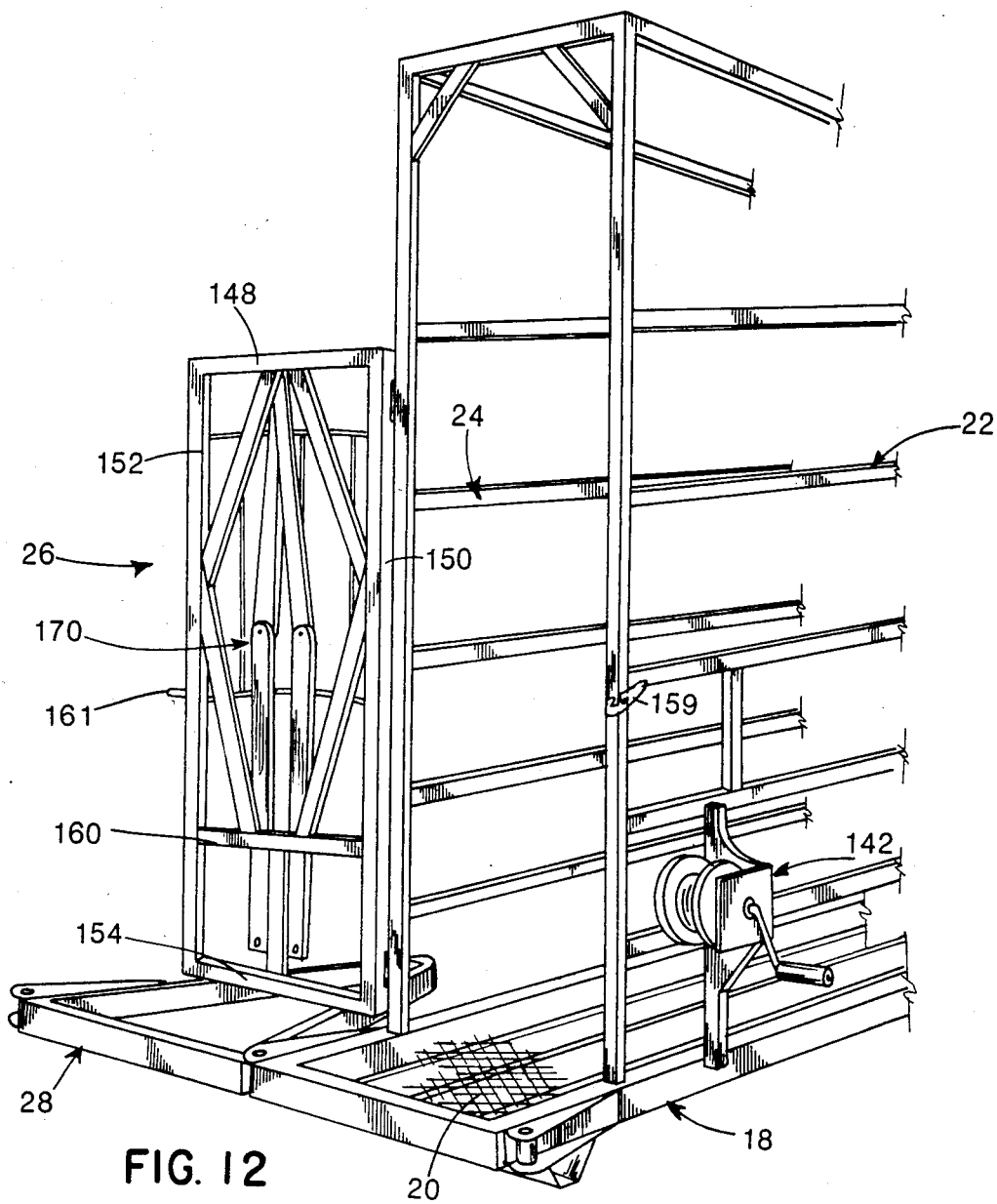
FIG. 12 is a fragmentary perspective view showing both the bail door and the tongue pivoted away from the forward end of the stock race.

After the animal has been treatd within race 12, bail assembly 170 is again opened by drawing the latch 194 outwardly and seating the hold 208 on catch 196. If necessary, latch 159 is then opened releasing bail door 26 to pivot to its open position as shown in FIG. 12, whereupon the animal can exit the race. Bail door 26 is then closed and bail assembly 170 is again positioned to receive the next animal. Preferably, the handle or latch 194 is positioned at a height of no more than five feet above the ground so that the arm is easily operated by one standing on the ground.

By making the floor of the race capable of being raised to an inclined position as disclosed in co-pending application Ser. No. 236,150, previously noted, the race can also be adapted to function as a cattle loading ramp with wings 16 serving as a herding means. When so used, the ability to retract or even remove the tongue or tow bar is most advantageous since it permits a truck or rail car to be moved up to the unit without obstruction.

As described above, portable stock handling unit 10 of the present invention provides an improved apparatus for the treatment of stock at remote locations. Unit 10 includes improved strength and operability over known units in a number of regards as set forth above. It is also more versatile and adaptable in its application.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

We claim:

1. An animal-retaining device comprising:
   a frame defining a space therein;
   first and second bail means movable opposite one another in a plane generally parallel to said frame for releasably securing an animal therebetween, each of said bail means including an upper member pivotally connected to a lower member, neither the upper nor lower member being capable of shifting radially of the pivotal interconnection;
   upper pivotal mounting means for mounting said upper members each about an upper pivot point for pivotal movement with respect to said frame, the distance if any between said upper pivot points being fixed throughout all movement of said device;
   lower pivotal mounting means for mounting said lower members each about a lower pivot point for pivotal movement with respect to said frame, the distance if any between said lower pivot points being fixed throughout all movement of said device;
   shifting means for allowing one of said upper and lower pivotal mounting means to shift in a plane generally parallel to said frame; and
   means for moving said bail means and for releasably locking said bail means toward one another, whereby when an animal's head passes through said frame space said means can be actuated to secure the animal's head between said bail means and to subsequently release the animal's head.

2. An animal-retaining device as defined in claim 1 wherein said one pivotal mounting means compises said lower pivotal mounting means, whereby said bail means move toward one another under the force of gravity.

3. An animal-retaining device comprising:
   a frame defining a space therein;
   first and second bail means movable opposite one another in a plane generally parallel to said frame, for releasably securing an animal, each of said bail means including an upper member pivotally connected to a lower member;
   upper pivotal mounting means for mounting said upper members for pivotal movement with respect to said frame;
   lower pivotal mounting means for mounting said lower members for pivotal movement with respect to said frame;
   shifting means for allowing one of said upper and lower pivotal mounting means to shift in a plane generally parallel to said frame, said shifting means including a shift element shiftable with respect to said frame, said one pivotal mounting means being connected to said shift element; and
   means for moving said bail means and for releasably locking said bail means toward one another, whereby when an animal's head passes through said frame space said means can be actuated to secure the animal's head between said bail means and to subsequently release the animal's head.

4. An animal-retaining device as defined in claim 3 wherein said one pivotal mounting means comprises said lower pivotal mounting means, whereby said bail means move toward one another under the force of gravity.

5. An animal-retaining device as defined in claim 3 wherein said shifting means further comprises a track operatively supported by said frame, and wherein said shift element rides along said track.

* * * * *